United States Patent Office 3,378,336
Patented Apr. 16, 1968

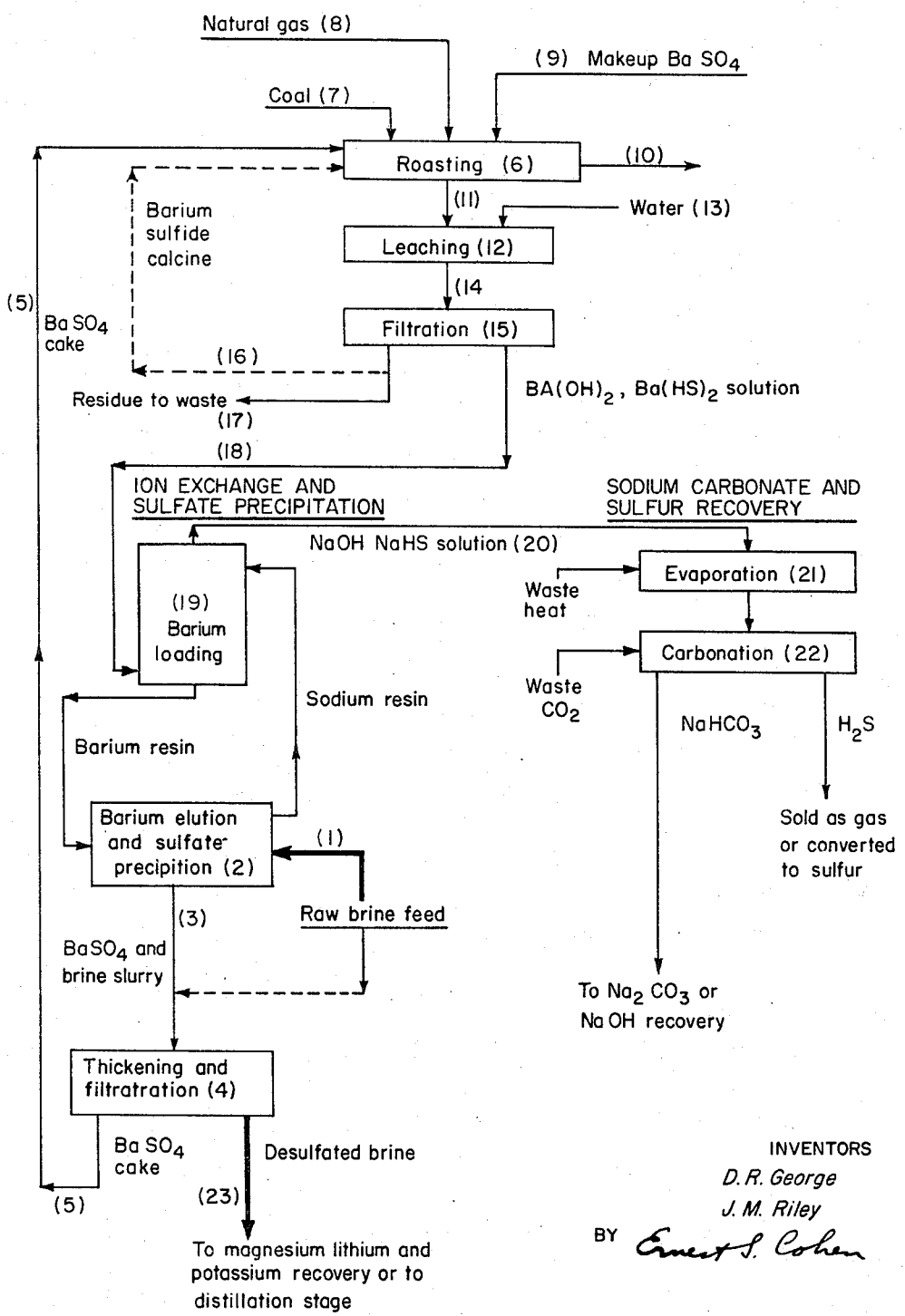

3,378,336
SULFATE REMOVAL FROM BRINES
D'Arcy R. George and James M. Riley, Salt Lake City,
Utah, assignors to the United States of America as represented by the Secretary of the Interior
Filed June 17, 1966, Ser. No. 559,346
9 Claims. (Cl. 23—64)

ABSTRACT OF THE DISCLOSURE

A novel method for the removal of sulfates from brines is presented. It involves contacting the brine with an ion-exchange resin in the barium form thereby precipitating the sulfates as barium sulfate and converting the resin to an alternate metal form. This converted resin may then be reconverted to the barium form for further use by contact with a barium solution. A method is disclosed wherein the precipitated barium sulfate is reduced to barium sulfide and leached with water to form a barium hydroxide-barium hydrosulfide solution which is used to reconvert the resin to the barium form. In this reconversion step, a solution containing sodium hydroxide and sodium hydrosulfide is produced and is converted by evaporation and carbonation into valuble sodium and sulfur compounds. The process of this invention may be used to remove sulfates from brines in connection with a saline water conversion and/or a mineral recovery operation.

---

This invention relates to the treatment of saline solutions and more particularly the removal of sulfate from natural and artificial saline solutions.

In recent years, there has been great interest shown in processes designed to recover valuable chemicals and/or purified water from saline solutions. The seas, inland brine waters and industrial brines and bitterns offer a vast potential source of valuable chemicals such as alkali and alkaline earth metals, sulfates, halogens and of course, fresh water. An example is the Great Salt Lake which is the largest reserve of high-grade brine in the United States. It covers an area of more than 1,000 square miles and contains approximately 10 million acre feet of brine with a dissolved salt content of about 27 percent or approximately 4.5 billion tons. The composition of the dissolved salts is in percent, 70 NaCl, 14 MgCl$_2$, 12 Na$_2$SO$_4$, and 4 KCl; thus the lake waters contain about 3.1 billion tons of NaCl, 630 million tons of MgCl$_2$, 540 million tons of Na$_2$SO$_4$, and 180 million tons of KCl. There also are smaller but significant concentrations of bromine and lithium. A major technical problem restricting the economical recovery of these materials is the high sulfate content of the brine feeds. In the case of chemicals recovery, the precipitation of complex single and double sulfates during evaporation renders the recovery of pure materials such as potassium chloride, magnesium chloride, and lithium salts almost impossible. In desalination operations, the formation of calcium sulfate scale continues to be a problem of major significance as this type of scale formation prohibits the use of high temperatures in distillation operations. To increase the efficiency of these processes it is necessary to eliminate or greatly reduce the sulfate content of the brine feeds. When used herein, the terms sulfate, chloride, sodium, calcium, magnesium, barium and potassium etc., are meant to include their ions.

Prior art methods directed at sulfate removal in chemical recovery processes have generally caused the sulfate to precipitate as calcium sulfate by adding calcium chloride to the brine. This requires either a source of waste or inexpensive calcium chloride or a source of waste or inexpensive hydrochloric acid from which calcium chloride can be made by reaction with limestone.

Prior art processes designed to remove scale forming ingredients from saline solutions prior to distillation have generally followed one of two paths. In one method, calcium and magnesium are removed from the saline solutions by for example ion exchange techniques. U.S. Patent 3,056,651 is an example of such a process, whereby ion exchange resins are used to remove a portion of the calcium and magnesium before the residual saline water is distilled. Large amounts of calcium and magnesium must be removed, and no valuble by-products are produced.

Recently, it has been found that hydroxide and carbonate scales of magnesium and calcium can be controlled by acid additions whereas, sulfate scales are not amenable to acid control. Therefore, the second method involves a removal of sulfate before or after acid addition. Sulfate removal has been effected by precipitation of calcium sulfate by seeding or contact stabilization and the precipitate has been discarded.

Accordingly, it is an object of this invention to provide a method wherein barium sulfate is removed from saline solutions.

Further, it is an object of this invention to provide a method of sulfate removal from brines wherein valuable chemical constituents are recovered as by-products.

Still further it is an object of this invention to provide a method of sulfate removal from saline solutions wherein the treated brine is subsequently converted to potable water.

These and other objects will become apparent from the following disclosure wherein reference is made to the flow sheet of the accompanying drawing.

Briefly, in a general form, the present invention comprises contacting sulfate bearing saline solution containing dissolved alkali metal salts with a cation exchange resin in the barium form, thereby simultaneously precipitating the sulfate as barium sulfate and converting the resin to an alkali metal form. The resin and suspension of barium sulfate and brine are separated, for example by screening, and the barium sulfate is recovered from the desulfated brine by thickening and filtration. The resin is then regenerated by contacting it with a solution containing dissolved barium, such as, a solution of barium chloride, barium nitrate, barium hydroxide, or barium hydrosulfide. The barium loaded resin is then recycled to treat more raw brine. Thus, this invention provides for the efficient removal of sulfate by a novel method comprising a cation exchange and precipitation of the sulfate as barium sulfate.

The process in a more preferred form, comprises contacting the sulfate-bearing sodium containing saline solution with a cation exchange resin in the barium form, thereby simultaneously precipitating the sulfate as barium sulfate and converting the resin, predominantly to the sodium form. The barium sulfate is recovered by thickening and filtration, and roasted with carbon to form barium sulfide. The barium sulfide is dissolved in water to produce a strong solution of barium hydroxide and barium hydrosulfide, that is then used to regenerate the spent resin to the barium form, thereby completing the cycle. The effluent liquor from regeneration of the resin with the barium hydrosulfide, barium hydroxide liquor is a solution of sodium hydroxide and sodium hydrosulfide of corresponding strength, which upon carbonation yields sodium bicarbonate and hydrogen sulfide. The bicarbonate may then be converted to sodium carbonate or hydroxide and the hydrogen sulfide may be converted to either sulfur or sulfuric acid. The desulfated brine may then be passed to potassium, lithium and magnesium recovery or it may be utilized as feed for a desalination distillation plant.

For a more complete description of the present invention and its preferred embodiments, reference is made to the flow sheet of the accompanying drawing.

Raw brine feed 1 containing sodium and an objectionable amount of sulfate which may be in sea water, an inland brine such as the Great Salt Lake, or an industrial brine or bittern, is fed to a barium elution and sulfate precipitation circuit 2 where the brine contacts a cation exchange resin in the barium form and the following reaction occurs:

$$Na_2SO_4 + BaR_2 \rightleftarrows BaSO_4 + 2NaR$$

where R=resin. The cation exchange resins used in the resin cycle should be of the strongly acid nuclear-sulfonic type. Preferred resins are cross-linked polystyrenes with sulfonic acid groups. Examples of this type are: Dowex 50, Amberlite IR–120, Nalcite HCR, Permutit Q, Duolite C–20 and C–25 and Lewatit S–100. Simultaneous elution of barium and precipitation of barium sulfate may be brought about by agitating the resin with brine in a tank or, preferably, to avoid short circuiting of the resin, in a number of tanks connected in series. Resin is fed to the first tank and sulfate brine is metered to each of the tanks and the resin and brine move cocurrently through the tanks. In contacting the barium-form resin with a sulfate-bearing brine, it is essential to prevent blockage of the resin by precipitation of barium sulfate within the resin particles. This is avoided by metering the raw sulfate bearing brine to each of the resin eluting tanks at such a rate that a small concentration of free barium is always present in the solution which is in contact with the resin. As a result, the sulfate is precepitated in the solution phase and not within the resin particles. To acquire free barium in solution upon start up, the resin is briefly contacted with sulfate free brine to elute a small portion of barium from the resin.

After removing the resin by screening on other suitable means, the precipitated barium sulfate and brine slurry 3 then pass to a thickening and filtration circuit 4 where the solid barium sulfate 5 is separated. The separated barium sulfate cake is brought via 5 to a roasting furnace 6. There, the sulfate is reduced to the sulfide in accordance with the following reaction:

$$BaSO_4 + 2C \rightleftarrows BaS + 2CO_2$$

The reduction roasting may take place with coal 7 and natural gas 8. However, a variety of fuels and carbonaceous materials may be used as inputs to the roaster, such as for example, charcoal, coal, lignite, petroleum cake, producer gas, natural gas, fuel gas, oil, or by a mixture of any of or all of these agents. The reaction is complete in about 2 hours at 1000° C. or 1 hour at 1100° C. Make-up barium sulfate 9, which may be in the form of barite, is added to the roasting stage when needed. Since, however, the efficiency of the present process is very high, as will be further demonstrated, very little make-up is necessary.

The products of the roasting are a combustion gas 10 comprising N, CO, $CO_2$ or $SO_2$, or mixtures thereof, depending upon the fuel used, and barium sulfide. The barium sulfide is passed va 11 to a leaching circuit 12 where it is admixed with a stream of water 13 and the following reaction occurs:

$$2BaS + 2H_2O \rightarrow Ba(HS)_2 + Ba(OH)_2$$

The products of this reaction being soluble, go into solution with the water. The solution is passed via 14 to a filtration circuit 15 where any residual solids are removed from the barium hydrosulfide-barium hydroxide solution. Any solid barium sulfide calcine which did not dissolve is recycled via 16. The remaining residue is passed to waste 17.

The solution containing $Ba(OH)_2$ and $Ba(HS)_2$ is then passed via 18 to a barium loading circuit 19 where it contacts the discharge sodium-form resin formed in the barium elution and sulfate precipitation circuit and the following reaction takes place:

$$Ba(SH)_2 + Ba(OH)_2 + 4NaR^1$$
$$\rightleftarrows 2BaR_2 + 2NaOH + 2Na(HS)$$

¹ R=resin.

The barium-loaded resin is then passed to the barium elution precipitation circuit 2 which completes the barium and resin cycles. The resins heretofore described, have an exchange capacity of from about 2.1 to 2.5 equivalents per liter which corresponds to a loading capacity of from about 9 to 11 pounds of barium per cubic foot of resin. The loading of the resin with barium may be accomplished by conventional ion exchange techniques. However, because it is desirable to recover sodium and sulfur compounds from the sodium hydroxide-sodium hydrosulfide effluent stream 20, it is preferable to load the resin from a solution containing two to three equivalents of barium per liter. It is also preferable to use a packed resin loading column in which both the resin and solution move continuously and countercurrently. In the operation of such a column, resin in the sodium form is introduced at the top and the strong barium leach solution at the bottom, and the two flow countercurrently. The resin in the barium form is withdrawn by gravity at the bottom and a solution essentially free of barium overflows at the top. With a column of this type, operating with a 1.6 M solution of barium, resin has been fully loaded with barium at resin flows in excess of 2.5 gallons per square foot per minute at resin retention times of 25 minutes. Simultaneously, the effluent contained less than 0.1 gram of barium per liter, which represents an absorption efficiency of over 99.95 percent. The concentration of the sodium hydroxide-sodium hydrosulfide effluent will correspond to the concentration of the barium input liquor by a factor of 2. Thus if the liquor feed or influent is a 1.5 M-barium hydroxide-barium hydrosulfide solution, the effluent is a 3 M sodium hydroxide-sodium hydrosulfide solution.

Effluent 20 from the resin loading circuit is processed to recover valuable sodium and sulfur compounds. If desired it may first be concentrated by evaporation with waste heat in 21 and then carbonated in 22 to form sodium bicarbonate and hydrogen sulfide by the following reaction:

$$NaOH + NaHS + 2CO_2 + H_2O \rightleftarrows 2NaHCO_3 + H_2S$$

The bicarbonate may easily be converted by heat to the carbonate according to the following reactions:

$$2NaHCO_3 \rightleftarrows Na_2CO_3 + CO_2 + H_2O$$

The carbonate may be used as such or may be converted to sodium hydroxide. The hydrogen sulfide produced in 22 may serve as an end product or as an intermediate in the production of sulfur by the Claus-Chance reaction:

$$2H_2S + O \rightleftarrows 2S + 2H_2O$$

In turn, sulfur may be converted to sulfuric acid or other valuable products.

The desulfated brine 23 may also be treated for the recovery of valuable chemicals such as lithium, potassium, magnesium, chlorine, and bromine depending upon the composition of the raw feed brine 1. A feed brine such as that obtained from the Great Salt Lake is readily amenable after desulfation, to recovery of potassium and magnesium chlorides by evaporation and fractional, crystallization techniques alone, or by a combination of evaporation, crystallization and froth flotation. These techniques are well known in the art and are often employed for the recovery of salts from industrial brines. A common treatment comprises (1) evaporation to a specific gravity of about 1.24, (2) removal of the crystallized sodium chloride, (3) further evaporation to a specific gravity of about 1.29 to crystallize sodium chloride and potassium chloride, (4) resolution of the mixed sodium chloride and potassium chloride in hot water, (5) cooling to recrystallize potassium chloride substantially free of sodium chloride, (6) evaporation of the bittern from Step 3 to a specific gravity of about 1.35 to precipitate carnallite ($KCl \cdot MgCl_2 \cdot 6H_2O$) and sodium chloride, and (7) vacuum drying the final bittern to obtain $MgCl_2 \cdot 1.5H_2O$.

The desulfated brine may also be fed to a distillation desalination unit without fear of calcium sulfate scale formation. Thus the distillation may be rendered more efficient by operating at temperatures at which calcium sulfate scale would normally form. Of course, it is also possible to carry out the aforementioned chemical recovery operations on the brine after it had been concentrated by a distillation desalination unit.

The success of any of the above-mentioned recovery operations depends upon the efficiency obtained in the sulfate removal which in turn depends upon the efficiency by which barium is loaded on and eluted from the resin. Therefore, the following examples will serve as an aid in demonstrating the efficiency of the present invention.

EXAMPLE 1

Seventy milliliters of Dowex–50 resin contained in a 0.5 inch diameter glass column, was loaded from a barium hydrosulfide solution of 1.25 M concentration, at an upflow solution flow rate of 3 ml./min., equivalent to a solution retention time of 9.3 minutes. Graph 1 shows sorption of barium from which it is evident that barium is easily loaded on the resin.

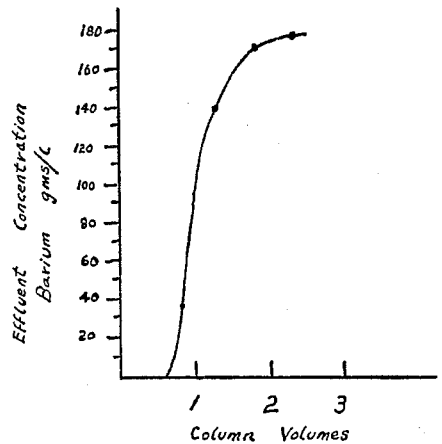

EXAMPLE 2

Fifty milliliters of resin, loaded to 170 grams of barium per liter, was contacted 20 times, each of 3 minutes duration, with 300-ml. portions of sulfate-free Great Salt Lake brine. The individual effluents were assayed for barium and the cumulative elution of barium was plotted graphically as shown in Graph 2. This graph shows that the rate of eluation of barium is also very favorable.

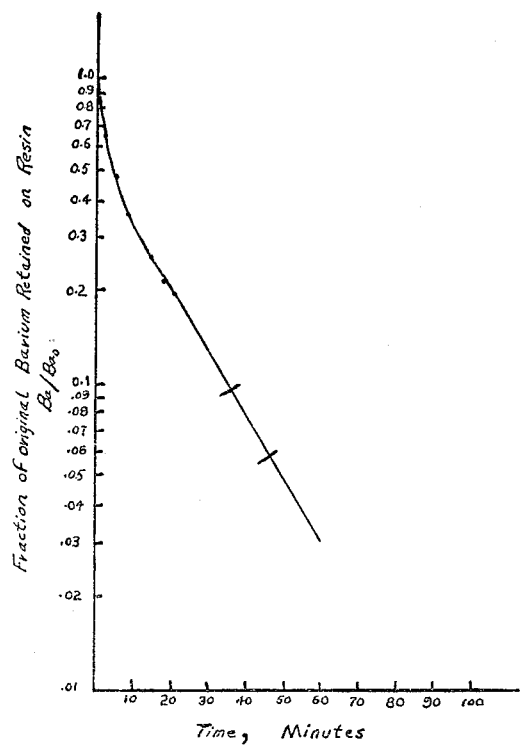

The results of Examples 1 and 2 taken together indicate a very efficient resin cycle. This efficiency of the resin cycle, along with the extremely low solubility of barium sulfate and the high degree of conversion possible in the reduction roasting of barium sulfate make the whole sulfate removal process highly efficient. Consequently, very little make-up resin or barium sulfate is needed. The ability of the present process to produce valuable products simultaneously with the removal of sulfate makes the use of the present process attractive in a variety of processes designed to recover valuable products from raw brine. In this respect, many variations, modifications and adaptations of the instant invention will be apparent to those of ordinary skill in the art. Thus, while there is here illustrated and described a certain preferred procedure which is presently regarded as the best mode of carrying out the invention, it should be understood that various changes may be made without departing from the spirit and scope of the invention concepts which are particularly pointed out and claimed herebelow.

What is claimed is:

1. A method of removing sulfate from saline solutions having alkali metal salts including sulfate dissolved therein which comprises:
   (a) contacting a cation exchange resin in the barium form with said saline solution to precipitate sulfate as barium sulfate and to convert the resin to an alkali metal form;
   (b) controlling the amount of said saline solution in contact with said resin so as to continually maintain a concentration of free barium in said saline solution;
   (c) separating the precipitated barium sulfate from the desulfated saline solution;
   (d) contacting the alkali metal form resin obtained in Step (a) with a barium containing solution to convert the resin to the barium form; and
   (e) recycling the barium form resin obtained in Step (d) to Step (a).

2. The method of claim 1 wherein the desulfated saline solution is passed to a distillation stage.

3. A method of removing sulfate from a saline solution having sodium and sulfate dissolved therein which comprises:

(A) contacting said saline solution with a cation exchange resin in the barium form to precipitate said dissolved sulfate as barium sulfate and to convert the resin to the sodium form and wherein a small concentration of free barium is continually maintained in the saline solution;

(B) separating the precipitated barium sulfate from residual desulfated brine;

(C) roasting the separated barium sulfate in a reducing atmosphere to form barium sulfide;

(D) leaching the barium sulfide with water to form an aqueous solution containing barium hydroxide and barium hydrosulfide;

(E) contacting the aqueous solution formed in Step D with the sodium form resin formed in Step A to convert the resin to the barium form, and to obtain an aqueous solution containing sodium hydroxide and sodium hydrosulfide;

(F) recycling the barium form resin formed in Step E to Step A.

4. The method of claim 3 wherein the solution containing sodium hydroxide and sodium hydrosulfide formed in Step E is carbonated to form hydrogen sulfide and sodium bicarbonate.

5. The method of claim 4 wherein the saline solution is a brine comprising magnesium, potassium, sodium and sulfate, and wherein the desulfated brine is fractionally crystallized to recover magnesium and potassium salts.

6. The method of claim 5 wherein the brine consists of Great Salt Lake brine.

7. The method of claim 3 wherein the desulfated saline solution is passed to a distillation stage.

8. The method of claim 3 wherein the contacting of Step E is countercurrent.

9. The method of claim 5 wherein a small concentration of free barium is maintained in solution during Step A and wherein the contacting of Step E is countercurrent.

References Cited
UNITED STATES PATENTS

| | | | |
|---|---|---|---|
| 1,457,934 | 6/1923 | Pierce | 23—122 |
| 2,150,394 | 3/1939 | Muller | 23—122 |
| 2,793,099 | 5/1957 | Clarke | 23—89 |
| 2,743,165 | 4/1956 | Miller et al. | 23—89 XR |
| 2,830,878 | 4/1958 | Miller et al. | 23—89 XR |

OSCAR R. VERTIZ, *Primary Examiner.*

EDWARD STERN, *Examiner.*